(12) United States Patent
Bade et al.

(10) Patent No.: US 7,484,099 B2
(45) Date of Patent: Jan. 27, 2009

(54) METHOD, APPARATUS, AND PRODUCT FOR ASSERTING PHYSICAL PRESENCE WITH A TRUSTED PLATFORM MODULE IN A HYPERVISOR ENVIRONMENT

(75) Inventors: Steven A. Bade, Georgetown, TX (US); Ryan Charles Catherman, Raleigh, NC (US); James Patrick Hoff, Raleigh, NC (US); Nia Letise Kelley, Austin, TX (US); Emily Jane Ratliff, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 946 days.

(21) Appl. No.: 10/902,712

(22) Filed: Jul. 29, 2004

(65) Prior Publication Data

US 2006/0026693 A1     Feb. 2, 2006

(51) Int. Cl.
*H04L 9/00* (2006.01)
(52) U.S. Cl. .......................................... 713/176; 713/2
(58) Field of Classification Search ................... 713/2, 713/176
See application file for complete search history.

(56) References Cited

U.S. PATENT DOCUMENTS

| 7,194,619 | B2* | 3/2007 | Abbondanzio et al. ...... 713/155 |
| 2002/0087877 | A1* | 7/2002 | Grawrock ................... 713/200 |
| 2003/0188179 | A1* | 10/2003 | Challener et al. ........... 713/193 |
| 2004/0199769 | A1* | 10/2004 | Proudler ..................... 713/169 |
| 2005/0033970 | A1* | 2/2005 | Anson et al. ................ 713/189 |

OTHER PUBLICATIONS

Trusted Computing Platforms: TCPA Technology in Context, Prentice Hall, 2002, p. 31, Siani Pearson.*
Not Assigned, Bade et al., Method, Apparatus, and Product for Providing a Multi-Tiered Trust Architecture.
Not Assigned, Arndt et al., Method, Apparatus, and Product for Providing a Scalable Trusted Platform Module in a Hypervisor Environment.
Not Assigned, Bade et al., Method, Apparatus, and Product for Providing a Backup Hardware Trusted Platform Module in a Hypervisor Environment.

* cited by examiner

*Primary Examiner*—Kristine Kincaid
*Assistant Examiner*—Harris C Wang
(74) *Attorney, Agent, or Firm*—Duke W. Yee; Diana L. Roberts-Gerhardt; Sarah B. Foley

(57) ABSTRACT

A method, apparatus, and computer program product are described for asserting physical presence in a trusted computing environment included within a data processing system. The trusted computing environment includes a trusted platform module (TPM). The data processing system is coupled to a hardware management console. The trusted platform module determines whether the hardware management console is a trusted entity. The trusted platform module also determines whether the hardware management console has knowledge of a secret key that is possessed by the TPM. If the TPM determines that the hardware management console is a trusted entity and has knowledge of the secret key, the TPM determines that physical presence has been asserted. Otherwise, if the TPM determines that either the hardware management console is not a trusted entity or the TPM determines that the hardware management console does not have knowledge of the secret key, the TPM determines that physical presence has not been asserted and will not execute commands that require the successful assertion of "physical presence".

11 Claims, 10 Drawing Sheets

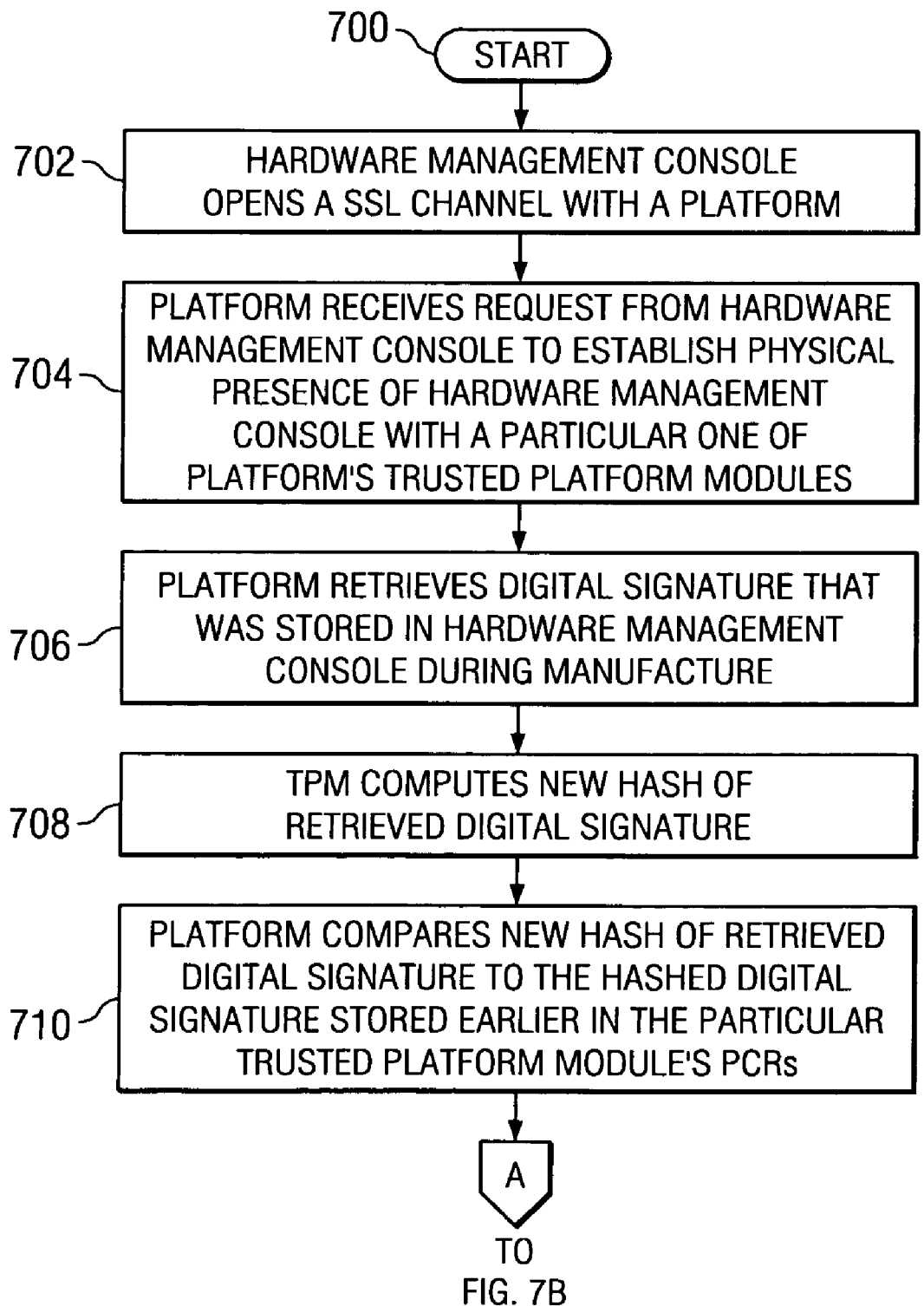

METHOD, APPARATUS, AND PRODUCT FOR ASSERTING PHYSICAL PRESENCE WITH A TRUSTED PLATFORM MODULE IN A HYPERVISOR ENVIRONMENT

CROSS-REFERENCE TO RELATED APPLICATIONS

The subject matter of the present invention is related to the subject matter of co-pending U.S. patent applications: Ser. No. 10/902,669, entitled METHOD, APPARATUS, AND PRODUCT FOR PROVIDING A MULTI-TIERED TRUST ARCHITECTURE; Ser. No. 10/902,670, entitled METHOD, APPARATUS, AND PRODUCT FOR PROVIDING A SCALABLE TRUSTED PLATFORM MODULE IN A HYPERVISOR ENVIRONMENT; and Ser. No. 10/902,711, entitled METHOD, APPARATUS, AND PRODUCT FOR PROVIDING A BACKUP HARDWARE TRUSTED PLATFORM MODULE IN A HYPERVISOR ENVIRONMENT, all filed on the same date herewith, assigned to the same assignee, and incorporated herein in its entirety by reference.

BACKGROUND OF THE INVENTION

1. Field of the Invention

The present invention relates generally to an improved data processing system and, in particular, to a method, apparatus, and computer program product for data storage protection using cryptography. Still more particularly, the present invention relates generally to a method, apparatus, and computer program product for asserting physical presence to a trusted platform module in a hypervisor environment.

2. Description of Related Art

Most data processing systems contain sensitive data and sensitive operations that need to be protected. For example, the integrity of configuration information needs to be protected from illegitimate modification, while other information, such as a password file, needs to be protected from illegitimate disclosure. As another example, a data processing system needs to be able to reliably identify itself to other data processing systems.

An operator of a given data processing system may employ many different types of security mechanisms to protect the data processing system. For example, the operating system on the data processing system may provide various software mechanisms to protect sensitive data, such as various authentication and authorization schemes, while certain hardware devices and software applications may rely upon hardware mechanisms to protect sensitive data, such as hardware security tokens and biometric sensor devices.

The integrity of a data processing system's data and its operations, however, centers around the issue of trust. A data processing system's data and operations can be verified or accepted by another entity if that entity has some manner for establishing trust with the data processing system with respect to particular data items or particular operations.

Hence, the ability to protect a data processing system is limited by the manner in which trust is created or rooted within the data processing system. To address the issues of protecting data processing systems, a consortium of companies has formed the Trusted Computing Group (TCG) to develop and to promulgate open standards and specifications for trusted computing. According to the specifications of the Trusted Computing Group, trust within a given data processing system or trust between a data processing system and another entity is based on the existence of a hardware component within the data processing system that has been termed the trusted platform module (TPM).

A trusted platform enables an entity to determine the state of the software environment in that platform and to seal data to a particular software environment in that platform. The entity deduces whether the state of the computing environment in that platform is acceptable before performing a transaction with that platform. To enable this, the trusted platform provides integrity metrics, also known as integrity measurements, to the entity that reflects the integrity of the software state of the trusted platform, and the integrity measurements require a root of trust within the computing platform. In order for a system to be a trusted platform, the integrity measurements must be taken from the Core Root of Trust for Measurements and extended through the initial program load (IPL) process up to the point at which the operating system is initialized.

A trusted platform module (TPM) has been generally described in a platform-independent manner, but platform-specific descriptions have been created for certain classes of systems, such as personal computers (PCs). Existing hardware for trusted computing has focused on implementations for a single trusted platform module for a single system.

There are some TCG commands that require the physical presence of a user before the TPM will execute the commands. For these commands, "physical presence" must be asserted before the commands will be executed. Physical presence of a user is typically proven by having a user depress a key or depress a particular key sequence.

It may be desirable, however, for a remote computer system to act as a proxy for a user without actually requiring the user to be physically present when "physical presence" is established with the TPM, such as in a computer cluster. Therefore, it would be advantageous to have a mechanism in an environment, that includes a high-performance trusted platform module (TPM), for enabling a hardware management console (HMC) to successfully establish "physical presence" to the TPM so that the TPM will execute commands that require "physical presence" be asserted as a prerequisite before being executed.

SUMMARY OF THE INVENTION

A method, apparatus, and computer program product are described for asserting physical presence in a trusted computing environment included within a data processing system. The trusted computing environment includes a trusted platform module (TPM). The data processing system is coupled to a hardware management console (HMC) that is a stand-alone computer system that is external to the data processing system. The trusted platform module determines whether the hardware management console is a trusted entity. The trusted platform module also determines whether the hardware management console has knowledge of a secret key that is possessed by the TPM. If the TPM determines that the hardware management console is a trusted entity and has knowledge of the secret key, the TPM determines that physical presence has been asserted. Otherwise, if the TPM determines that either the hardware management console is not a trusted entity or the TPM determines that the hardware management console does not have knowledge of the secret key, the TPM determines that physical presence has not been asserted and will not execute commands that require the successful assertion of "physical presence".

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, further objectives, and advantages thereof, will be best understood by reference to the following detailed description when read in conjunction with the accompanying drawings, wherein:

FIGS. 7A and 7B together depict a high level flow chart that illustrate a hardware management console attempting to prove physical presence in accordance with the present invention.

DETAILED DESCRIPTION OF THE INVENTION

Figure 1A:
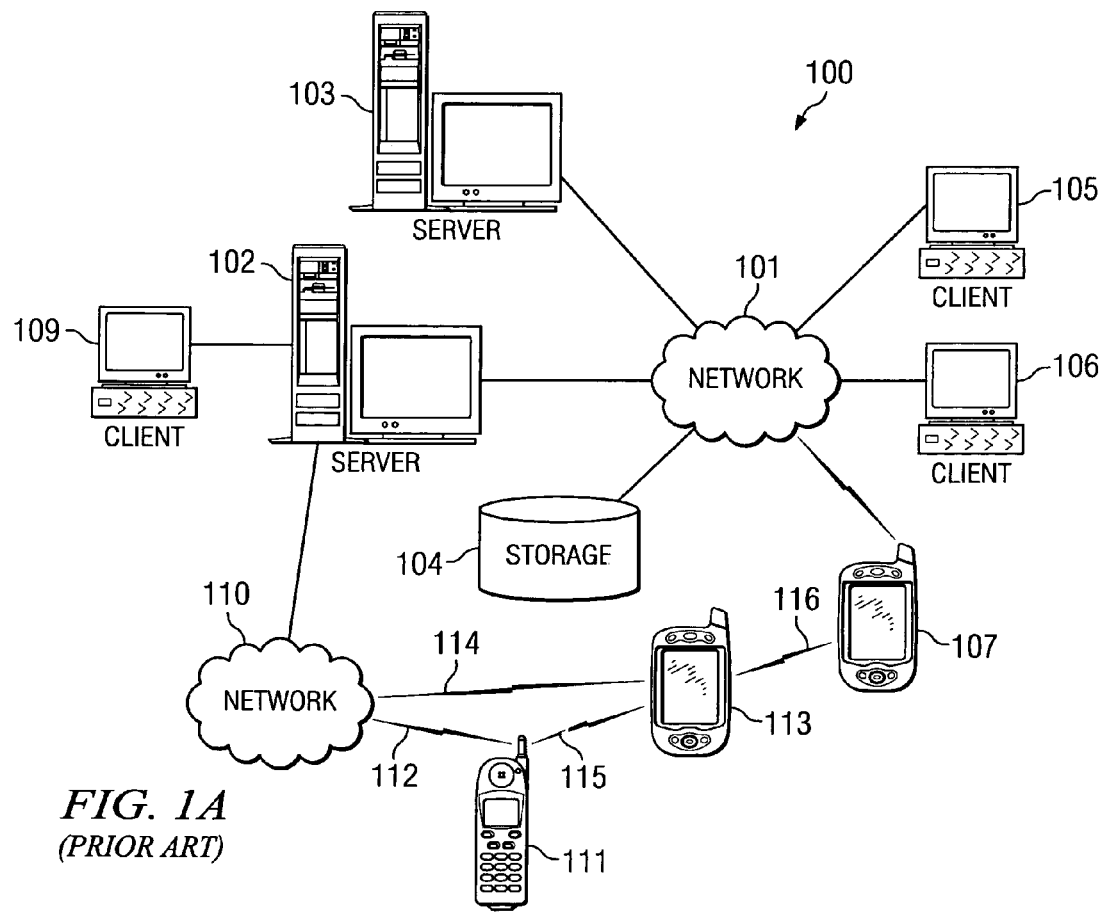
FIG. 1A depicts a typical network of data processing systems, each of which may be used to implement the present invention.

The present invention is a method, apparatus, and computer program product for asserting physical presence in a trusted computing environment included within a data processing system. The data processing system is coupled to a hardware management console (HMC) that is external to the data processing system. The HMC may be simultaneously coupled to multiple data processing systems. Each data processing system includes a platform that includes a physical hardware trusted platform module (TPM). Each physical hardware TPM includes its own unique secret key.

In order to successfully assert its physical presence to a particular TPM, the HMC must be verified as a trusted entity, and the HMC must prove that it has knowledge of a secret that is shared with the particular TPM. If the HMC is verified and proves that it has knowledge of the shared secret, physical presence is successfully asserted to the particular TPM.

When the HMC is manufactured, a digital signature is stored within the HMC. The signature will be used by a hardware TPM to determine whether the HMC is a trusted entity.

During the booting of the entire system including booting the data processing system and the HMC, a platform will retrieve the digital signature from the HMC. The platform's TPM will then hash the signature to generate a first hashed signature value. The platform will then store this first hashed signature value in the TPM.

Also during this boot process, the TPM will send to the HMC the TPM's secret key. The HMC then associates this received secret key with the TPM that sent the key. The HMC stores this secret key for later use.

When the HMC attempts to execute a command, on a particular physical TPM, that requires physical presence, a determination is made as to whether the command is a type that requires the successful assertion of physical presence before the TPM will execute the command. If this command is a type that requires physical presence, the HMC attempts to assert its physical presence to the TPM. If the HMC does assert its physical presence, the HMC will be allowed to take ownership of the TPM and the command will be executed by the TPM. Otherwise, if the HMC does not assert its physical presence, the command will not be executed by the TPM.

To assert physical presence to a particular TPM, the HMC first opens a secure sockets layer (SSL) channel with the platform that includes the particular TPM. The platform then receives a request from the HMC to establish physical presence of the HMC with a particular one of the platform's TPMs. Next, the platform retrieves the digital signature that was stored in the HMC during the manufacturing of the HMC. The platform's TPM then computes a second hashed signature value of that digital signature. The platform compares the second hashed signature value to the first hashed signature value that was stored during the boot process. If these hashed values are the same, the HMC is determined to be a trusted entity. If these hashed values are different, the HMC is not determined to be a trusted entity.

Next, if the HMC is determined to be a trusted entity, the HMC must prove that it has knowledge of a secret shared with the particular TPM. In a preferred embodiment, the shared secret is the TPM's secret key.

To prove that is has knowledge of the secret key, the HMC identifies a secret key stored in the HMC that is associated with this particular TPM. The HMC then transmits this secret key to the particular TPM. This particular TPM then determines whether the received key is the same as the secret key the particular TPM has stored within it. If the keys match, the particular TPM determines that physical presence has been established and will then execute commands, for the HMC, that require physical presence.

There are two embodiments regarding the storage of the secret key. According to the first embodiment, the HMC can retrieve the key from the TPM during boot time. According to the second option, the key is stored in the HMC during the manufacturing process of the system that includes the HMC and the TPM.

In a preferred embodiment, the secret key is the private key of a public/private key pair.

FIG. 1A depicts a network of data processing systems, each of which may be used to implement the present invention. Distributed data processing system 100 contains network 101, which is a medium that may be used to provide communications links between various devices and computers connected together within distributed data processing system 100. Network 101 may include permanent connections, such as wire or fiber optic cables, or temporary connections made through telephone or wireless communications. In the depicted example, server 102 and server 103 are connected to network 101 along with storage unit 104. In addition, clients 105-107 also are connected to network 101. Clients 105-107 and servers 102-103 may be represented by a variety of computing devices, such as mainframes, personal computers, personal digital assistants (PDAs), etc. Distributed data processing system 100 may include additional servers, clients, routers, other devices, and peer-to-peer architectures that are not shown.

In the depicted example, distributed data processing system 100 may include the Internet with network 101 representing a worldwide collection of networks and gateways that use various protocols to communicate with one another, such as Lightweight Directory Access Protocol (LDAP), Transport Control Protocol/Internet Protocol (TCP/IP), Hypertext Transport Protocol (HTTP), Wireless Application Protocol (WAP), etc. Of course, distributed data processing system 100 may also include a number of different types of networks, such as, for example, an intranet, a local area network (LAN), or a wide area network (WAN). For example, server 102 directly supports client 109 and network 110, which incorporates wireless communication links. Network-enabled phone 111 connects to network 110 through wireless link 112, and PDA 113 connects to network 110 through wireless link 114. Phone 111 and PDA 113 can also directly transfer data between themselves across wireless link 115 using an appropriate technology, such as Bluetooth™ wireless technology, to create so-called personal area networks (PAN) or personal ad-hoc networks. In a similar manner, PDA 113 can transfer data to PDA 107 via wireless communication link 116.

Figure 1B:
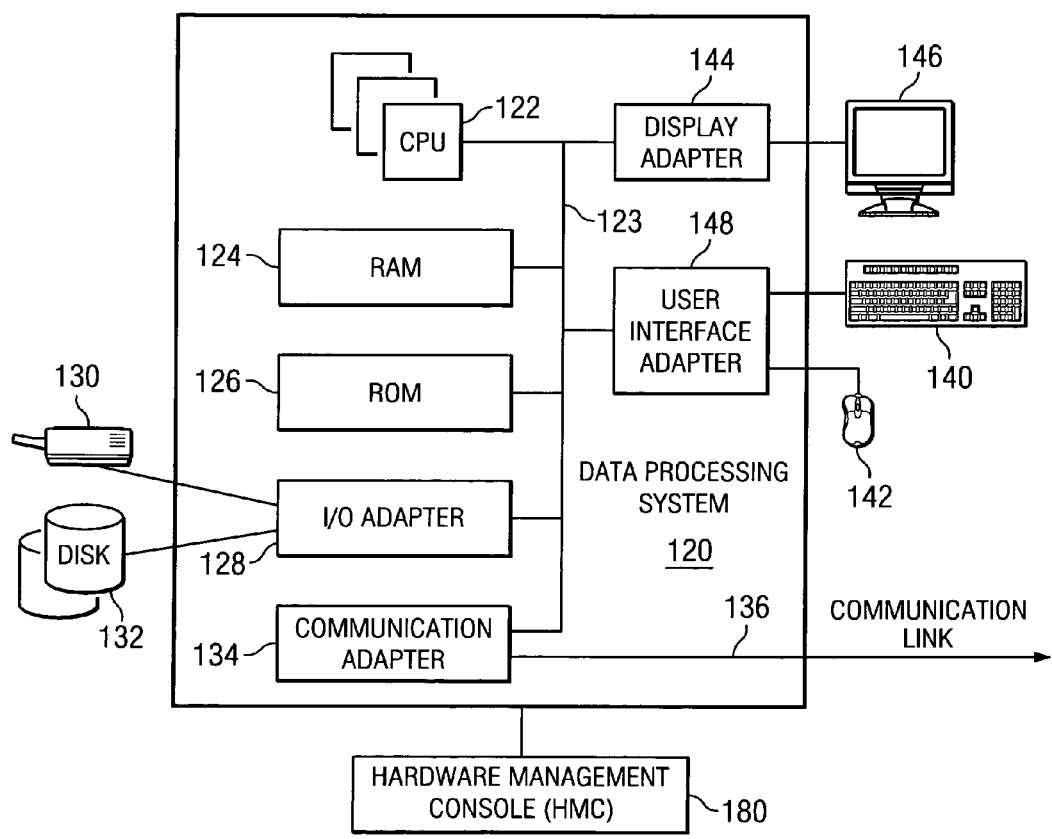
FIG. 1B depicts a data processing system, including peripherals, that is coupled to an external hardware management console in accordance with the prior art.

FIG. 1B depicts a data processing system 120, including peripherals, that is coupled to an external hardware management console (HMC) 180 in accordance with the prior art. Data processing system 120 contains one or more central processing units (CPUs) 122 connected to internal system bus 123, which interconnects random access memory (RAM) 124, read-only memory 126, and input/output adapter 128, which supports various I/O peripheral devices, such as printer 130, disk units 132, or other devices not shown, such as an audio output system, etc. System bus 123 also connects communication adapter 134 that provides access to communication link 136. User interface adapter 148 connects various peripheral user devices, such as keyboard 140 and mouse 142, or other devices not shown, such as a touch screen, stylus, microphone, etc. Display adapter 144 connects system bus 123 to peripheral display device 146.

Those of ordinary skill in the art will appreciate that the hardware in FIG. 1B may vary depending on the system implementation. For example, the system may have one or more processors, such as an Intel® Pentium®-based processor and a digital signal processor (DSP), and one or more types of volatile and non-volatile memory. Other peripheral devices may be used in addition to or in place of the hardware depicted in FIG. 1B. The depicted examples are not meant to imply architectural limitations with respect to the present invention.

A hardware management console (HMC) 180 is also depicted by FIG. 1B. HMC 180 is a stand-alone computer system that is separate from data processing system 120. An HMC is a client-based user console system that creates a graphical user interface that allows a user to control and manage the hardware within data processing system 120 as described in more detail below. Data processing system 120 is a logically partitioned computer system, such as depicted in FIG. 1D. HMC 180 is used to create and destroy logical partitions as well as assign resources to logical partitions without rebooting the entire system 120.

Figure 1C:
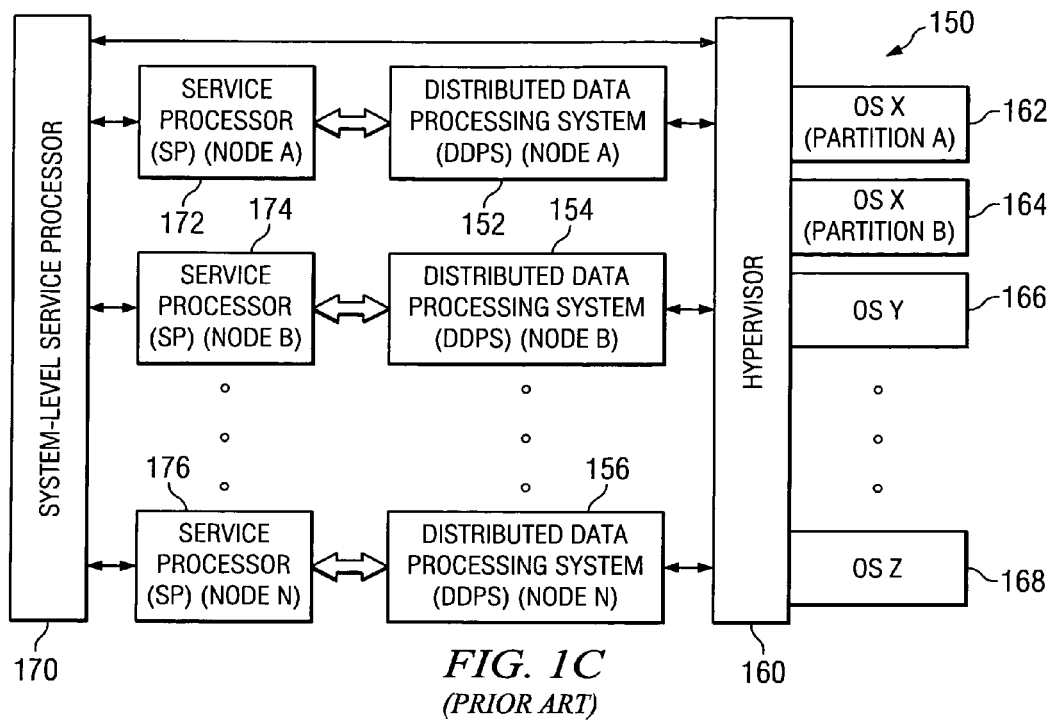
FIG. 1C depicts a block diagram that illustrates a distributed data processing system in accordance with the prior art.
Figure 1D:
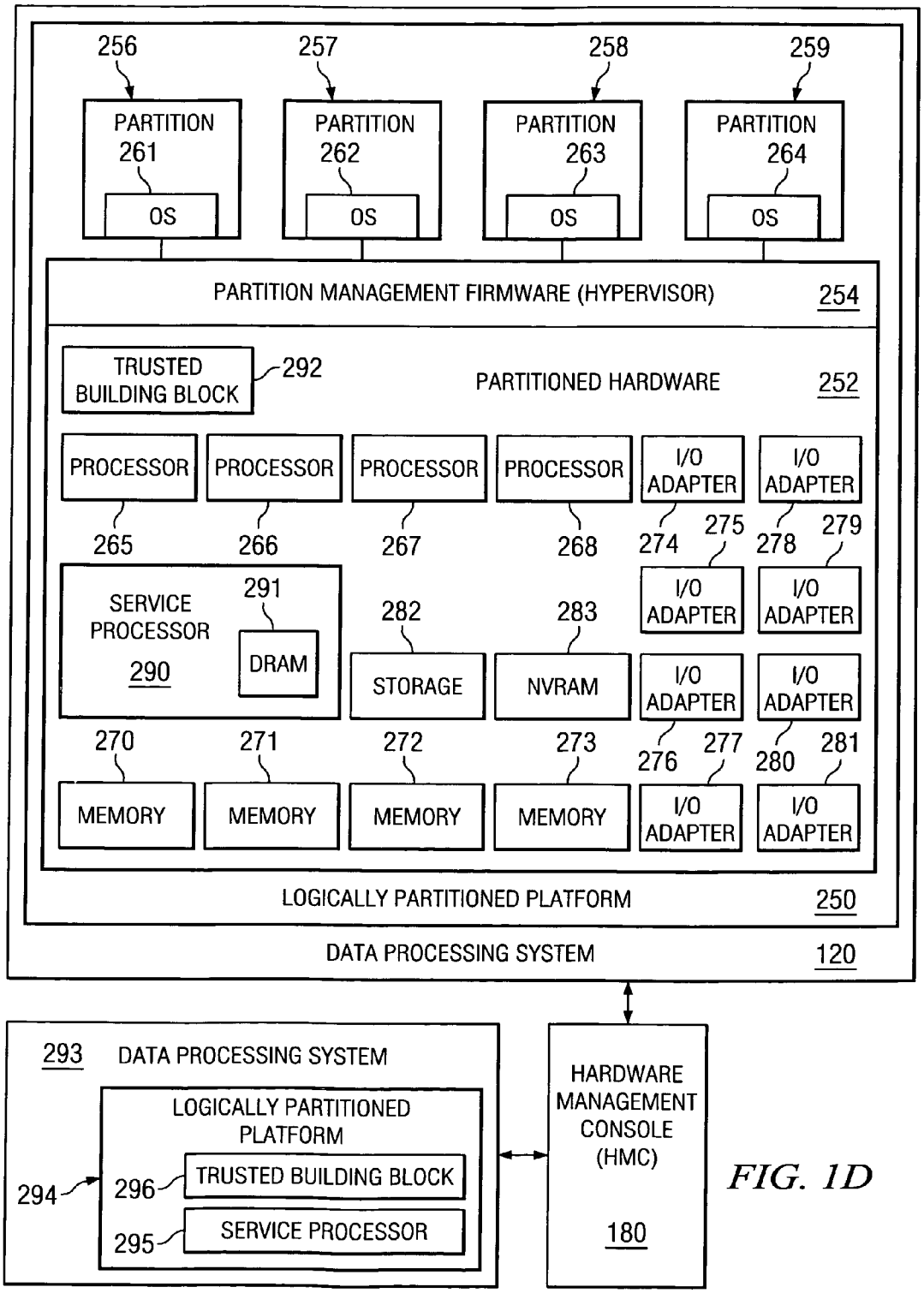
FIG. 1D is a block diagram of a logically partitioned platform in which the present invention may be implemented in accordance with the present invention.

FIG. 1C depicts an example of a distributed data processing system in accordance with the prior art. Distributed data processing system 150 contains multiple nodes 152-156, each of which may represent a single-processor or multi-processor device or card connected to a communication switch or a network; nodes 152-156 may be implemented as central electronic complex (CEC) units. Hypervisor 160 supports multiple instances of one or more operating systems and/or operating system partitions 162-168 on the shared computational resources of the distributed data processing nodes of system 150. Hypervisor 160 communicates with system-level service processor 170, which is responsible for booting system 150 and for monitoring the availability of the shared resources. Each distributed data processing node is associated with a service processor, e.g., service processors 172-176, each of which is responsible for booting its associated node and for assisting system-level service processor 170 in monitoring each of the nodes; a service processor may be associated with a node through a variety of physical connections to its associated node, e.g., the service processor's hardware card may attach to a PCI bus. It should be noted that each node may have a plurality of service processors, although only one service processor would be responsible for booting its associated node.

The present invention could be implemented on a variety of hardware platforms and computational environments; FIG. 1A, FIG. 1B, FIG. 1C, and FIG. 1D are intended as examples of a heterogeneous computing environment and not as architectural limitations for the present invention.

In addition to being able to be implemented on a variety of hardware platforms and computational environments, the present invention may be implemented in a variety of software environments. A typical operating system may be used to control program execution within each data processing system. For example, one device may run a Unix® operating system, while another device contains a simple Java® runtime environment. A representative computer platform may include a browser, which is a well known software application for accessing hypertext documents in a variety of formats, such as graphic files, word processing files, Extensible Markup Language (XML), Hypertext Markup Language (HTML), Handheld Device Markup Language (HDML), Wireless Markup Language (WML), and various other formats and types of files.

The present invention may be implemented on a variety of hardware and software platforms, as described above. More specifically, though, the present invention is directed to trusted computing platforms.

Although the present invention may be implemented in conjunction with a variety of trusted computing platforms, possibly in accordance with one or more standards, the examples of the present invention hereinbelow employ the terminology and examples from the standards and/or specifications that have been promulgated by the Trusted Computing Group (TCG); it should be noted, though, that the examples are not meant to imply architectural, functional, nor definitional limitations with respect to embodiments of the present invention.

FIG. 1D is a block diagram of a logically partitioned platform in which the present invention may be implemented. Logically partitioned platform 250 includes partitioned hardware 252, partition management firmware, also called a hypervisor 254, and partitions 256-259. Operating systems 261-264 exist within partitions 256-259. Operating systems 261-264 may be multiple copies of a single operating system or multiple heterogeneous operating systems simultaneously run on platform 250.

Partitioned hardware 252 includes a plurality of processors 265-268, a plurality of system memory units 270-273, a plurality of input/output (I/O) adapters 274-281, and a storage unit 282. Each of the processors 265-268, memory units 270-273, NVRAM storage 283, and I/O adapters 274-281 may be assigned to one of multiple partitions 256-259. Partitioned hardware 252 also includes service processor 290. A non-volatile memory device 291, such as an NVRAM device, is included within service processor 290.

Partition management firmware (hypervisor) 254 performs a number of functions and services for partitions 256-259 to create and enforce the partitioning of logically partitioned platform 250. Hypervisor 254 is a firmware implemented virtual machine identical to the underlying hardware. Firmware is "software" stored in a memory chip that holds its content without electrical power, such as, for example, read-only memory (ROM), programmable ROM (PROM), erasable programmable ROM (EPROM), electrically erasable programmable ROM (EEPROM), and non-volatile random access memory (non-volatile RAM). Thus, hypervisor 254 allows the simultaneous execution of independent OS images 261-264 by virtualizing all the hardware resources of logically partitioned platform 250. Hypervisor 254 may attach I/O devices through I/O adapters 274-281 to single virtual machines in an exclusive mode for use by one of OS images 261-264.

A hardware management console (HMC) 180 may be coupled to service processor 290 in data processing system 120. HMC 180 is a separate computer system that is coupled to service processor 290 and may be used by a user to control various functions of system 120 through service processor 290. HMC 180 includes a graphical user interface (GUI) which may be used by a user to select one or more partitions to be rebooted.

A trusted building block 292, which includes a trusted platform module, is also included within platform 250.

HMC 180 may also be coupled to another data processing system, such as system 293. Data processing system 293 includes logically partitioned platform 294. HMC 180 is coupled to service processor 295. A trusted building block 296 is included in platform 294.

Figure 2:
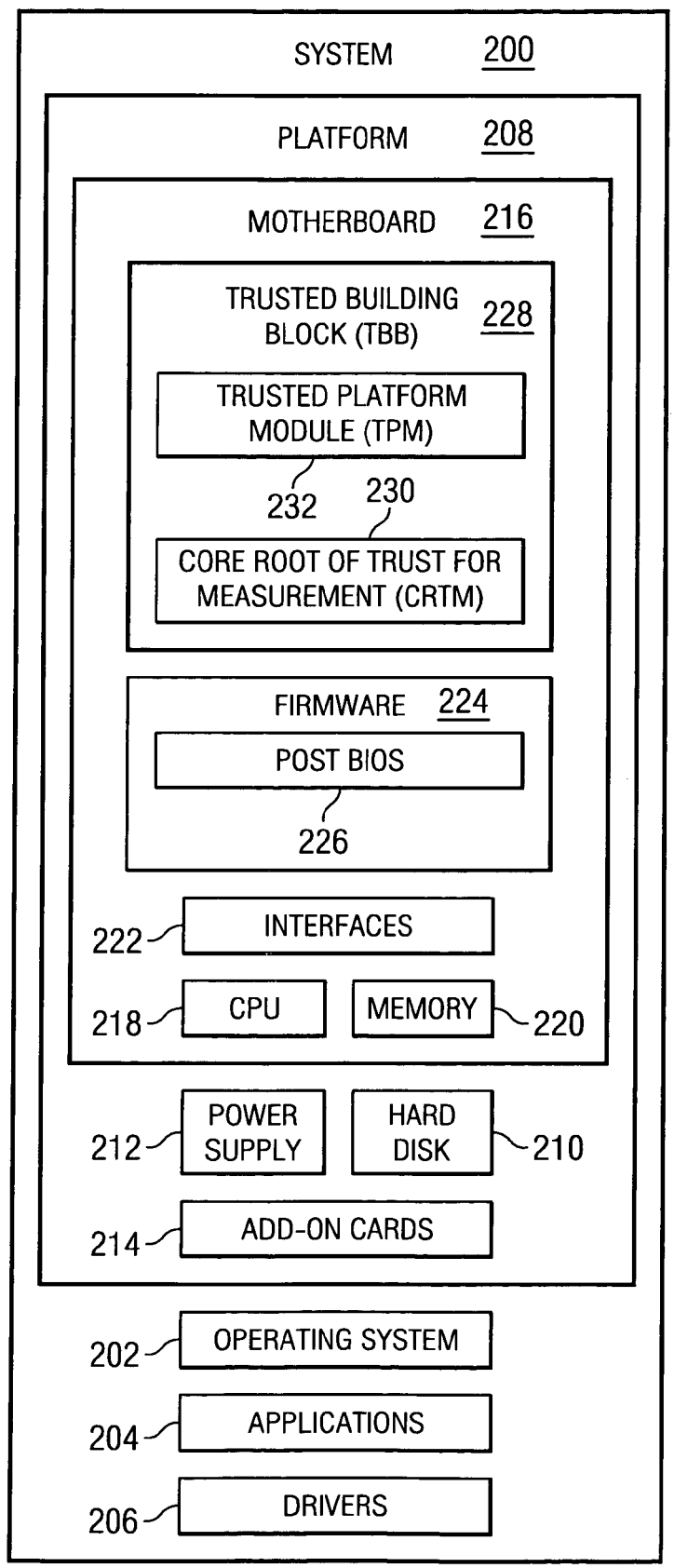
FIG. 2 depicts a system that includes a modified trusted platform module in accordance with the present invention.

FIG. 2 depicts a system that includes a modified trusted platform module in accordance with the present invention. System 200 supports execution of software components, such as operating system 202, applications 204, and drivers 206, on its platform 208. The software components may be received through a network, such as network 101 that is shown in FIG. 1A, or they may be stored, e.g., on hard disk 210. Platform 208 receives electrical power from power supply 212 for executing the software components on add-on cards 214 and motherboard 216, which includes typical components for executing software, such as CPU 218 and memory 220, although motherboard 216 may include multiple CPUs. Interfaces 222 connect motherboard 216 to other hardware components within system 200, and firmware 224 contains POST BIOS (power-on self-test basic input/output system) 226.

Motherboard 216 also comprises trusted building block (TBB) 228; motherboard 216 is supplied by a manufacturer with TBB 228 and other components physically or logically attached and supplied by the manufacturer. TBB 228 comprises the combination of the core root of trust for measurement (CRTM) component 230, the trusted platform module (TPM) 232, the connection of the CRTM to motherboard 216, and the connection of the TPM to motherboard 216.

TPM 232 is explained in more detail with respect to FIG. 3 hereinbelow. CRTM 230 is an immutable portion of the platform's initialization code that executes upon a platform reset; the platform's execution must begin at the CRTM upon any platform reset event. In this manner, the trust in the platform is based on the CRTM and the behavior of the TPM, and the trust in all measurements is based on the integrity of the CRTM. In the example that is shown in FIG. 2, the BIOS may be assumed to include a BIOS Boot Block and POST BIOS 226; each of these are independent components that can be updated independent of each other, wherein the manufacturer must control the update, modification, and maintenance of the BIOS Boot Block, but a third party supplier may update, modify, or maintain the POST BIOS component. In the example that is shown in FIG. 2, the CRTM may be assumed to be the BIOS Boot Block, and the POST BIOS is a measured component of the chain of trust. Alternatively, the CRTM may comprise the entire BIOS.

Figure 3:
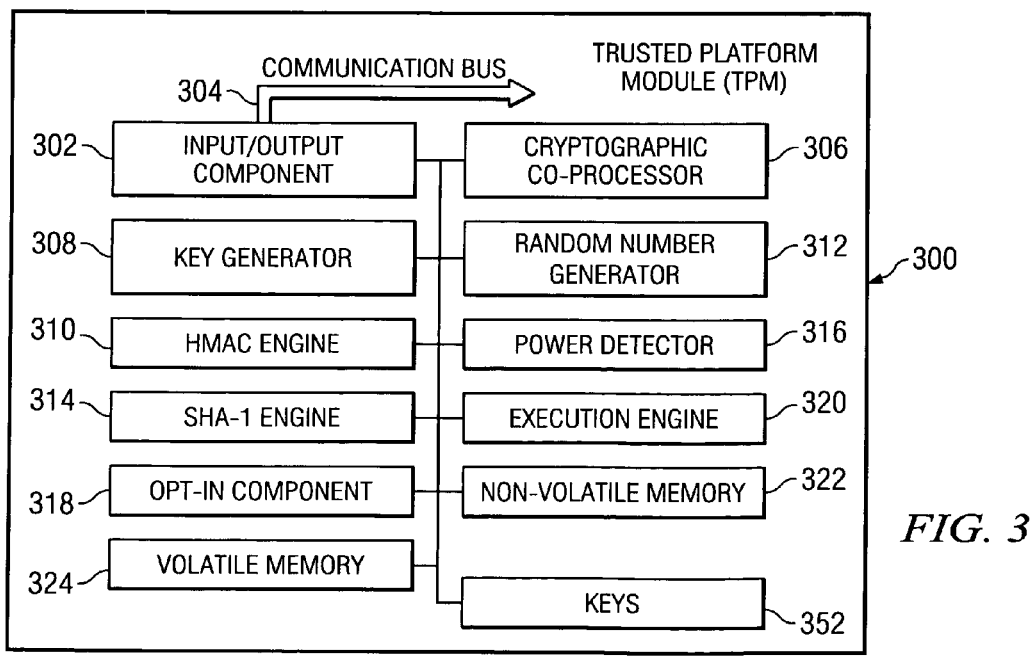
FIG. 3 depicts a block diagram of a modified trusted platform module (TPM) according to the present invention.

FIG. 3 depicts a block diagram of a modified trusted platform module (TPM) according to the present invention. Trusted platform module 300 comprises input/output component 302, which manages information flow over communications bus 304 by performing appropriate protocol encoding/decoding operations and routing of messages to appropriate components. Cryptographic co-processor 306 performs cryptographic operations within a trusted platform module. Key generator 308 creates symmetric keys and RSA asymmetric cryptographic key pairs. HMAC engine 310 performs HMAC (Keyed-Hashing for Message Authentication) calculations, whereby message authentication codes are computed using secret keys as integrity checks to validate information transmitted between two parties, e.g., in accordance with Krawczyk et al., "HMAC: Keyed-Hashing for Message Authentication", Request for Comments (RFC) 2104, Internet Engineering Task Force (IETF), February 1997.

Random number generator 312 acts as a source of randomness for the computation of various values, such as nonces, keys, or other values. SHA-1 engine 314 implements the SHA-1 hash algorithm. Power detector 316 manages the power states of a trusted platform module in association with the power states of the platform. Opt-in component 318 maintains the state of persistent and volatile flags and enforces semantics associated with those flags such that the trusted platform module may be enabled and disabled. Execution engine 320 runs program code to execute commands that the trust platform module receives through input/output component 302. Non-volatile memory 322 stores persistent identity and state associated with the trusted platform module; the non-volatile memory may store static data items but is also available for storing dynamic data items by entities that are authorized by the trusted platform module owner, whereas volatile memory 324 stores dynamic data items.

Keys 350, such as encryption keys and/or secret keys, are stored within TPM 300. Various encryption keys may be utilized by TPM 300 in order to authenticate another device and/or to communicate with another device. Although keys 352 are depicted separately from the other components of the TPM, the encryption keys will typically be stored in non-volatile memory 322. The keys may include a private TPM endorsement key, context encryption key used to encrypt a context when that context is stored outside of the TPM, and a platform binding key. The keys may also include a secret key that is used as described herein to determine physical presence. Other keys may also be stored in keys 352.

Figure 4:
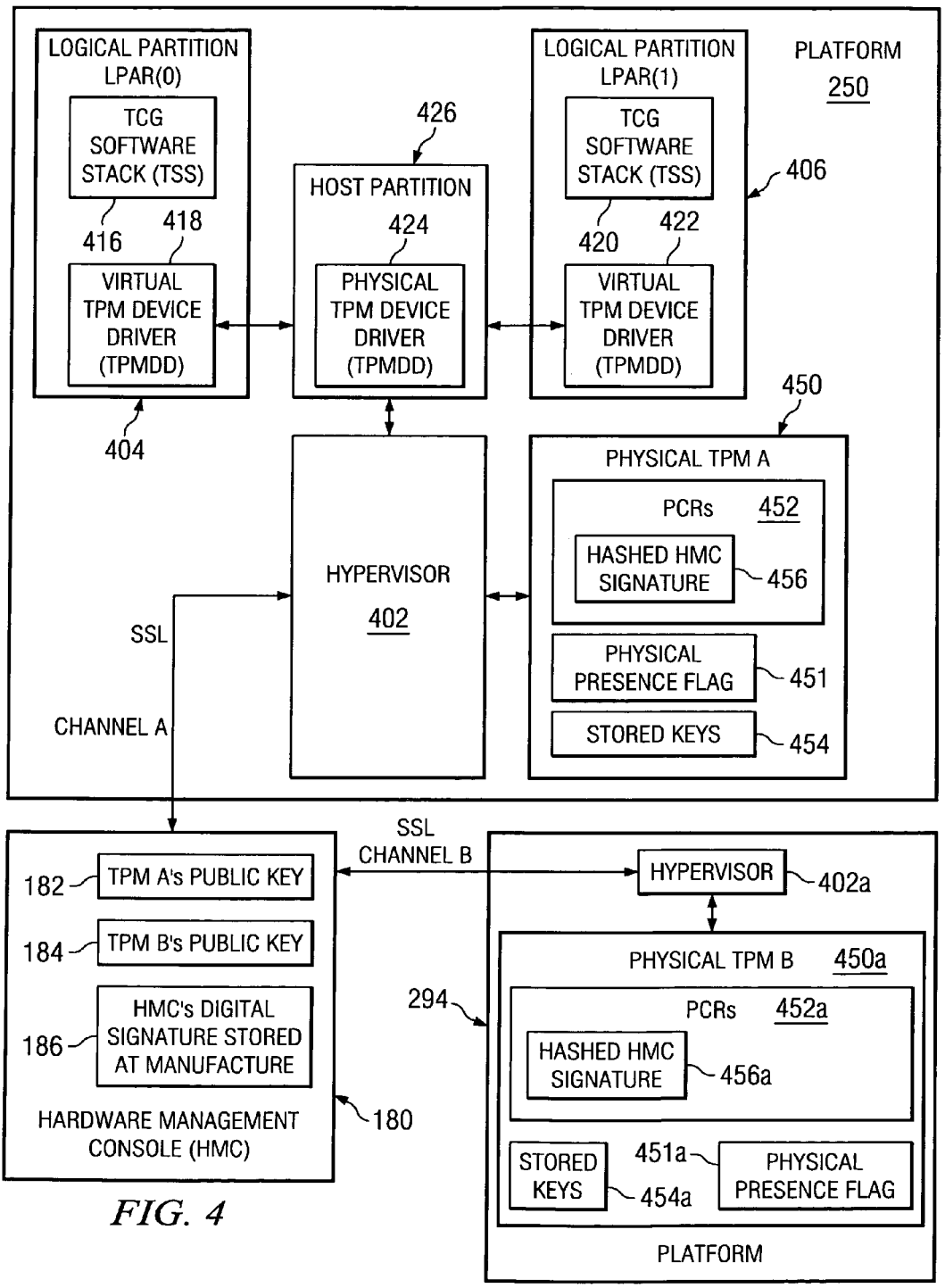
FIG. 4 depicts a block diagram that shows a hardware management console that is coupled to two different platforms in accordance with the present invention.

FIG. 4 depicts a block diagram that shows a hardware management console that is coupled to two different platforms in accordance with the present invention. Platform 250 contains a hypervisor 402 that supports multiple instances of one or more operating systems and/or logical partitions (LPARs) on the shared computational resources of platform 250. For example, hypervisor 402 supports LPARs 404 and 406.

Each LPAR includes a TCG software stack (TSS) and a TPM device driver (TPMDD). For example, LPAR 404 includes TSS 416 and TPMDD 418, while LPAR 406 includes TSS 420 and TPMDD 422. TSS 416 and TSS 420 implement the specification of the host programming interfaces that an operating system, an application, or other software component utilizes to interface with a TPM. TSS comprises: the TSS service provider, to which an entity may interface via common application programming interfaces (APIs); the TSS core services, which provides centralized management of key storage, contexts, and handles the direct interaction with the TPM on the host; and the TPM device driver library and the TPMDD, such as TPMDD 418 or TPMDD 422. Generally, all interfacing to the TPM occurs through TSS service provider interface (TSPI) or an API above the TSPI.

Hypervisor 402 is firmware that is responsible for creating and enforcing the partitioning of platform 250 among the various partitions. Hypervisor 402 provides a set of firmware services to the operating system in each partition so that interference between operating system images is prevented. Each partition includes an operating system executing in that partition that may be the same as or different from the operating system that is executing in the other logical partitions. Hypervisor 402 manages the logical partitions, and allocates and manages the physical devices that are allocated to each partition.

Instead of permitting logical partitions to access a hardware TPM, such as physical hardware TPM 450, directly, a virtual TPM is presented to each partition in the platform 250. Each partition may take advantage of a TPM's capabilities by accessing host partition 426.

A TPM is specified as an I/O device with operations into it being asynchronous; in the present invention, TPM 450 is represented as a virtual I/O device, i.e., a logical I/O device. Operations to the TPM 450, e.g., functional calls or requests from one of the partitions, such as LPAR 404, to HTPM 424, are placed onto an input queue (not shown) included in hypervisor 402, which causes a trap into hypervisor 402. Hypervisor 402 re-queues the operation to TPM 450, where the TPM functions are performed on a first-in, first-out basis. When the TPM function is complete, TPM 450 places the results on an output queue (not shown) which also causes a trap into hypervisor 402; hypervisor 402 then passes the results back to the calling entity.

In an alternative embodiment, TPM device driver 424 could be implemented within hypervisor 402. In a preferred embodiment, TPMDD 424 is managed by hypervisor 402 within a host logical partition, shown as Host partition 426, which is logically part of the hypervisor, e.g., its code is maintained as part of the certified hypervisor; the hypervisor creates Host partition 426 upon each reboot.

A physical hardware TPM 450 is included in platform 250 that communicates with hypervisor 402. TPM 450 includes platform control registers (PCRs) 452 in which integrity measurements are stored. The TCG specification defines integrity measurements as the computed hash values.

TPM 450 also includes stored keys 454. TPM 450 includes a flag 451 that indicates whether physical presence has been successfully asserted to TPM 450. When flag 451 is set, physical presence has been successfully asserted. When flag 451 is cleared, physical presence has not been successfully asserted. The physical presence flag is implemented and utilized according to the TCG specification.

During the boot process, TPM 450 retrieves the digital signature 186 for HMC 180 that was stored in HMC 180 when HMC 180 was manufactured. TPM 450 hashes the digital signature 186 and stores that hashed signature 456 in PCR 452. The HMC digital signature can be any type of signature. For example, in one embodiment, the digital signature may be the HMC code itself. Thus, TPM 450 will retrieve the HMC code, hash that code, and store the hashed value 456 in PCR 452.

A physical hardware TPM 450a is included in platform 294 that communicates with hypervisor 402a. TPM 450a includes platform control registers (PCRs) 452a in which integrity measurements are stored. TPM 450a also includes stored keys 454a. TPM 450a includes a flag 451a that indicates whether physical presence has been successfully asserted to TPM 450a. During the boot process, TPM 450a hashes the HMC's digital signature 186 and stores that hashed signature 456a in PCR 452a.

HMC 180 may be coupled to and manage more than one platform simultaneously. Thus, HMC 180 may be simultaneously coupled to both platform 250 and platform 294. According to the present invention, HMC 180 may establish a separate SSL channel with the hypervisor in each platform. For example, HMC 180 has established SSL channel A with hypervisor 402, and simultaneously established SSL channel B with hypervisor 402a.

HMC 180, during the boot process, will retrieve a copy of one of the keys 454 from TPM 450, and will retrieve a copy of one of the keys 454a from TPM 450a. The key 182 retrieved from TPM 450 and the key 184 retrieved from TPM 450a are stored in HMC 180. These keys are secret keys that will be used, in addition to the HMC hashed digital signature, by HMC 180 to help HMC 180 establish "physical presence".

Figure 5:
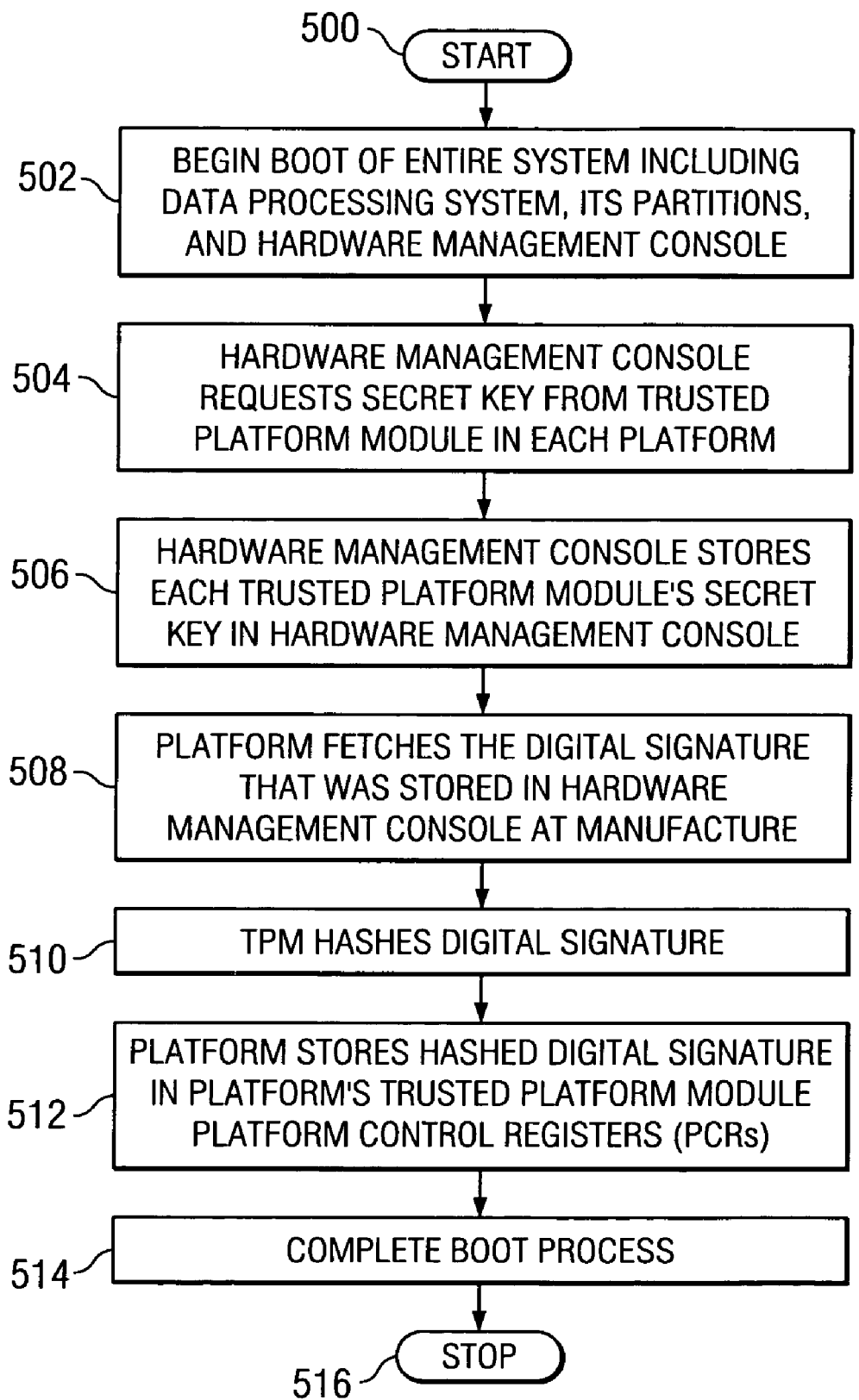
FIG. 5 depicts a high level flow chart that illustrates a boot process whereby a hardware management console and each platform share information that will be used to establish physical presence of the hardware management console in accordance with the present invention.

FIG. 5 depicts a high level flow chart that illustrates a boot process whereby a hardware management console and each platform share information that will be used to establish physical presence of the hardware management console in accordance with the present invention. The process starts as depicted by block 500 and thereafter passes to block 502 which illustrates beginning booting of the entire system that includes a data processing system, the data processing system's partitions, and a hardware management console (HMC). Next, block 504 depicts the HMC requesting a secret key from each trusted platform module (TPM) in each platform to which the HMC is coupled. The process then passes to block 506 which illustrates the HMC storing in the HMC each TPM's secret key.

Thereafter, block 508 depicts the platform fetching the digital signature that was stored in the HMC at the time of manufacture of the HMC. Any type of digital signature that identifies the HMC may be used. One example of such a digital signature is the entire HMC code itself. Another digital signature could be added at the beginning of the HMC code.

Next, block 510 illustrates the platform's TPM hashing this digital signature. Block 512, then, depicts the platform storing the hashed digital signature in the platform TPM's platform control registers (PCRs). The PCRs are used by a TPM in which to store integrity measurements. Thereafter, block 514 illustrates completing the boot process so that the entire system has been booted. The process then terminates as depicted by block 516.

Figure 6:
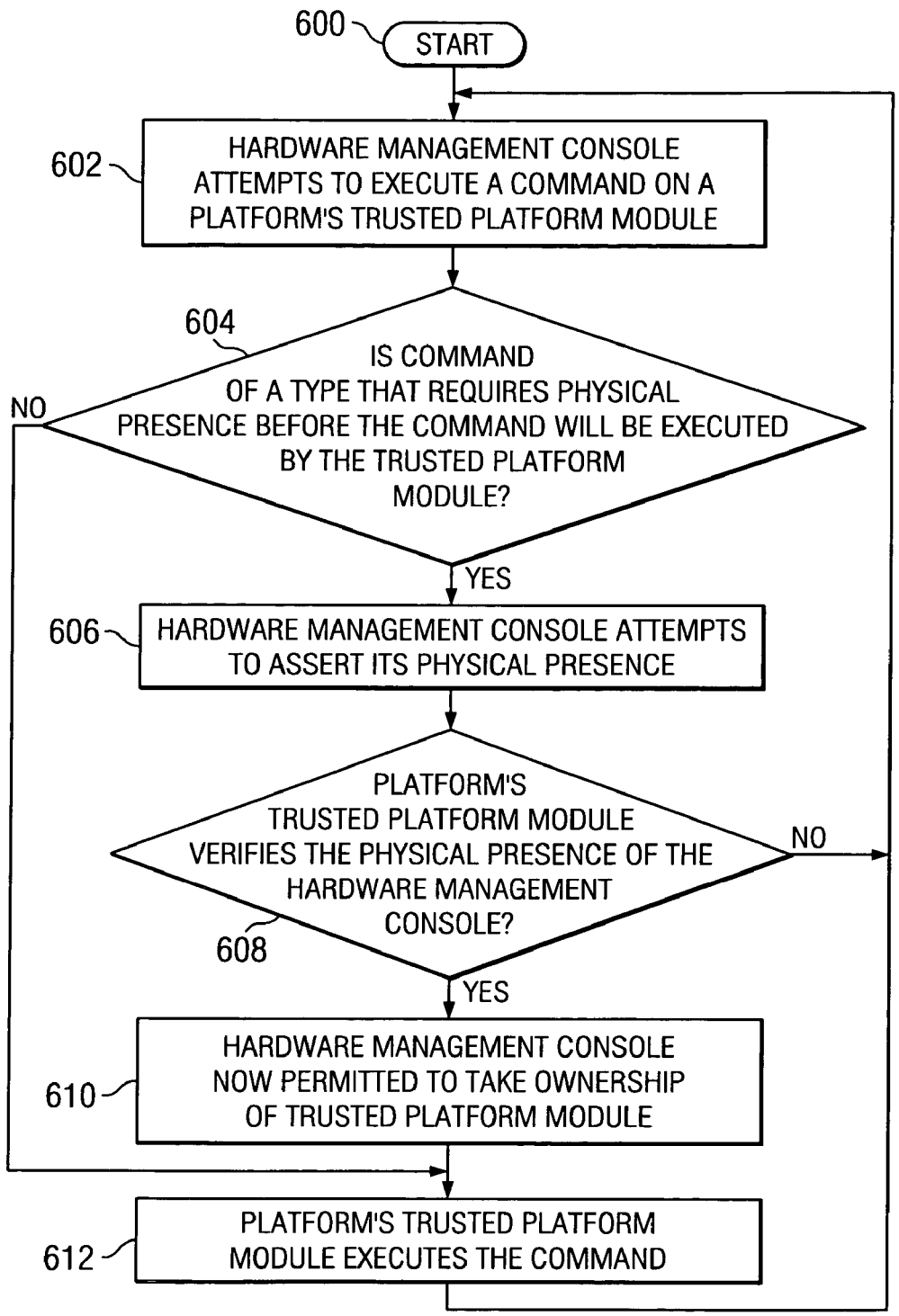
FIG. 6 illustrates a high level flow chart that depicts a hardware management console attempting to execute a command that requires physical presence of a user prior to executing the command in accordance with the present invention.

FIG. 6 illustrates a high level flow chart that depicts a hardware management console attempting to execute a command that requires physical presence of a user prior to executing the command in accordance with the present invention. The process starts as depicted by block 600 and thereafter passes to block 602 which illustrates the HMC attempting to execute a command on a particular TPM within a particular platform. Next, block 604 depicts a determination of whether or not the command is of a type that requires physical presence to be asserted before the particular TPM will execute the command.

Some commands require physical presence of a user at the platform before the command will be executed by the TPM. The direct interaction, i.e. the physical presence, of a human with the computer system is inferred when physical presence is successfully asserted to a TPM. Whether or not physical presence has been established is monitored within the TPM using a physical presence flag. When this flag is set, physical presence has been successfully established, i.e. physical presence has been asserted or proved. When this flag is cleared, physical presence has not been successfully established. According to the present invention, "physical presence" can be established, not by establishing the presence of a human, but by an HMC successfully executing the process depicted by FIG. 7.

Referring again to block 604, if a determination is made that the command is not a type that requires the assertion of physical presence, the process passes to block 612. Referring again to block 604, if a determination is made that the command is a type that requires physical presence being established before the command will be executed, the process passes to block 606 which depicts the HMC attempting to assert its physical presence. This step is described in more detail with reference to FIG. 7. Next, block 608 depicts a determination of whether or not the platform's TPM, on which the command is to be executed, has verified physical presence of the HMC. If a determination is made that the platform's TPM has not been able to verify the physical presence of the HMC, the process passes back to block 602.

Referring again to block 608, if a determination is made that the platform's TPM has been able to verify the physical presence of the HMC, the process passes to block 610 which depicts the HMC now being permitted to take ownership of the TPM. Next, block 612 illustrates the platform's TPM executing the command. The process then passes back to block 602.

Figure 7B:
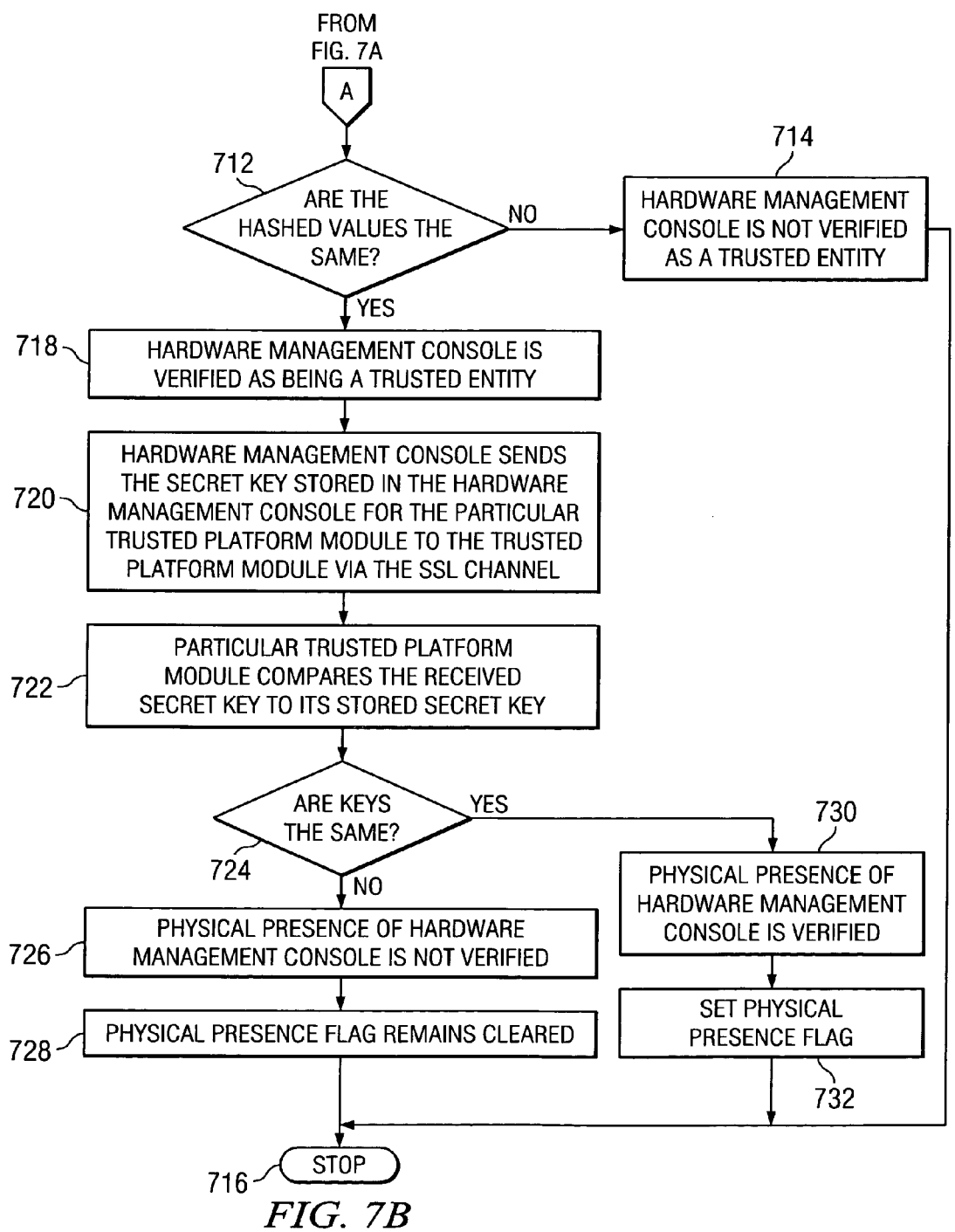

FIGS. 7A and 7B together depict a high level flow chart that illustrates a hardware management console attempting to assert physical presence in accordance with the present invention. The process starts as depicted by block 700 and thereafter passes to block 702 which illustrates the HMC opening a secure sockets link (SSL) channel with a particular platform. Next, block 704 depicts the platform receiving a request from the HMC to establish the HMC's physical presence with a particular one of the platform's TPMs.

The process then passes to block 706 which illustrates the platform retrieving the digital signature from the HMC that was stored in the HMC at the time the HMC was manufactured. Next, block 708 depicts the platform's TPM computing a new hash of this retrieved digital signature. Block 710, then, illustrates the platform comparing the new hash of the retrieved digital signature with the hashed digital signature that was stored earlier in this particular TPM's PCRs.

The process then passes to block 712 which depicts a determination of whether or not the previously stored hash value and the newly hashed value are the same values. If a determination is made that the values are not the same, the process passes to block 714 which illustrates the HMC not being verified as a trusted entity. The process then terminates as depicted by block 716.

Referring again to block 712, if a determination is made that the values are the same, the process passes to block 718 which illustrates the HMC being verified as a trusted entity. Thereafter, block 720 illustrates the HMC sending the secret key for the particular TPM, that had been stored in the HMC earlier, to the particular TPM via the SSL channel. The process then passes to block 722 which depicts the particular TPM comparing the secret key it just received from the HMC with the secret key the TPM already had stored within the TPM. Block 724, illustrates a determination of whether or not the keys are the same. If a determination is made that the keys are not the same, the process passes to block 726 which illustrates the physical presence of the HMC not being verified. Thereafter, block 728 depicts the physical presence flag in this TPM remaining cleared. The process then terminates as illustrated by block 716.

Referring again to block 724, if a determination is made that the keys are the same, the process passes to block 730 which illustrates the physical presence of the HMC being verified. Next, block 732 depicts setting the physical presence flag to indicate that physical presence has been established. The process then terminates as illustrated by block 716.

It is important to note that while the present invention has been described in the context of a fully functioning data processing system, those of ordinary skill in the art will appreciate that the processes of the present invention are capable of being distributed in the form of instructions in a computer readable medium and a variety of other forms, regardless of the particular type of signal bearing media actually used to carry out the distribution. Examples of computer readable media include media such as EPROM, ROM, tape, paper, floppy disc, hard disk drive, RAM, and CD-ROMs and transmission-type media, such as digital and analog communications links.

A method is generally conceived to be a self-consistent sequence of steps leading to a desired result. These steps require physical manipulations of physical quantities. Usually, though not necessarily, these quantities take the form of electrical or magnetic signals capable of being stored, transferred, combined, compared, and otherwise manipulated. It is convenient at times, principally for reasons of common usage, to refer to these signals as bits, values, parameters, items, elements, objects, symbols, characters, terms, numbers, or the like. It should be noted, however, that all of these terms and similar terms are to be associated with the appropriate physical quantities and are merely convenient labels applied to these quantities.

The description of the present invention has been presented for purposes of illustration but is not intended to be exhaustive or limited to the disclosed embodiments. Many modifications and variations will be apparent to those of ordinary skill in the art. The embodiments were chosen to explain the principles of the invention and its practical applications and to enable others of ordinary skill in the art to understand the invention in order to implement various embodiments with various modifications as might be suited to other contemplated uses.

What is claimed is:

1. A method for asserting physical presence in a trusted computing environment included within a data processing system, the data processing system coupled to a hardware management console, the method comprising:

providing a first trusted platform module in a first platform in the data processing system;

determining, by the first platform using the first trusted platform module whether the hardware management console is a trusted entity, wherein the step of determining whether the hardware management console is a trusted entity further comprises:

during booting of the data processing system: retrieving from the hardware management console, by the first platform that includes the first trusted platform module, the first digital signature; hashing, by the first trusted platform module, the first digital signature to generate a second hashed signature value; and storing, in the first trusted platform module, the second hashed signature value;

receiving, within the first trusted platform module, a request from the hardware management console for the first trusted platform module to execute a command;

determining whether the command requires that physical presence be verified by the first trusted platform module prior to the first trusted platform module executing the command;

responsive to determining during runtime of the data processing system that the command does require that physical presence be verified:
  retrieving from the hardware management console, by the first platform, said the digital signature;
  hashing, by the first trusted platform module, the first digital signature to produce a second hashed signature value;
  comparing, by the first platform, the second hashed signature value to the first hashed signature value;
  responsive to determining that the second hashed signature value is the same as the first hashed signature value, determining, by the first platform, that the hardware management console is a trusted entity; and
  responsive to determining that the second hashed signature value is different from the first hashed signature value, determining, by the first platform, that the hardware management console is not a trusted entity;

determining, by the first platform using the first trusted platform module, whether the hardware management console has knowledge of a first secret key possessed by the first trusted platform module, wherein determining whether the hardware management console has knowledge of the first secret key further comprises:
  requesting, by the hardware management console during booting of the data processing system, a key from the first trusted platform module;
  receiving, by the hardware management console from the first trusted platform module during booting of the data processing system, the key;
  associating the key, within the hardware management console during booting of the data processing system, with the first trusted platform module;
  storing, in the hardware management console during booting of the data processing system, the key;
  receiving, within the first trusted platform module, a request from the hardware management console for the first trusted platform module to execute a command;
  determining whether the command requires that physical presence be verified by the first trusted platform module prior to the first trusted platform module executing the command;
  responsive to determining that the command does require that physical presence be verified:
    receiving from the hardware management console, by the first trusted platform module, the key that the hardware management console has associated with the first trusted platform module;
    comparing, by the first platform using the first trusted platform module, the key received from the hardware management console with a key stored in the first trusted platform module;
    responsive to determining, by the first platform using the first trusted platform module, that the key received from the hardware management console is the same as the key stored in the first trusted platform module, determining that the hardware management console has knowledge of the first secret key; and
    responsive to determining, by the first platform using the first trusted platform module, that the key received from the hardware management console is different from the key stored in the first trusted platform module, determining that the hardware management console does not have knowledge of the first secret key;

responsive to determining that the hardware management console is a trusted entity and has knowledge of the first secret key, determining that physical presence has been successfully asserted to the first trusted platform module, wherein physical presence has been proven to the first trusted platform module;

storing, during a manufacturing of the hardware management console, a first digital signature in the hardware management console that identifies the hardware management console;

hashing the first digital signature, by the first trusted platform module, during booting of the hardware management console, to generate a first hashed signature value; and storing, during the booting, the first hashed signature value in the first trusted platform module.

2. The method according to claim 1, further comprising:
receiving, within the first trusted platform module, a request from the hardware management console for the first trusted platform module to execute a command;
determining whether the command requires that physical presence be verified by the first platform using the first trusted platform module prior to the first trusted platform module executing the command;
responsive to determining that the command does not require that physical presence be verified, executing, by the first trusted platform module, the command without verifying physical presence; and
responsive to determining that the command does not require that physical presence be verified, determining, by the first platform using the first trusted platform module, whether the hardware management console is a trusted entity and determining whether the hardware management console has knowledge of the secret key, and responsive to determining that the hardware management console is a trusted entity and has knowledge of the secret key, executing, by the first trusted platform module, the command.

3. The method according to claim 1, further comprising:
the data processing system including a second platform, that is separate from the first platform, that includes a second trusted platform module.

4. The method according to claim 3, further comprising:
including in the first trusted platform module the first secret key;
including in the second trusted platform module a second secret key;
during booting of the data processing system: requesting, by the hardware management console, the first secret key from the first trusted platform module; receiving, by the hardware management console from the first trusted platform module, the first secret key; associating the first secret key, within the hardware management console, with the first trusted platform module; requesting, by the hardware management console, the second secret key from the second trusted platform module; receiving, by the hardware management console from the second trusted platform module, the second secret key; associating the second secret key, within the hardware management console, with the second trusted platform module; and storing, in the hardware management console, the first and second secret keys;

receiving, within the second trusted platform module, a request from the hardware management console for the second trusted platform module to execute a command;

determining whether the command requires that physical presence be verified by the second trusted platform module prior to the second trusted platform module executing the command;

responsive to determining that the command does require that physical presence be verified:

receiving from the hardware management console, by the second trusted platform module, the second secret key that the hardware management console has associated with the second trusted platform module;

comparing, by the second platform that includes the second trusted platform module, the second secret key received from the hardware management console with the second secret key stored in the second trusted platform module;

responsive to determining, by the second platform that includes the second trusted platform module, that the second secret key received from the hardware management console is the same as the second secret key stored in the second trusted platform module, determining that the hardware management console has knowledge of the second secret key; and responsive to determining, by the second platform that includes the second trusted platform module, that the second secret key received from the hardware management console is different from the second secret key stored in the second trusted platform module, determining that the hardware management console does not have knowledge of the second secret key.

5. An apparatus for asserting physical presence in a trusted computing environment included within a data processing system, the data processing system coupled to a hardware management console, the apparatus comprising:

a first trusted platform module in a first platform in the data processing system;

the first platform using the first trusted platform module for determining whether the hardware management console is a trusted entity, wherein the platform determining whether the hardware management console is a trusted entity further comprises:

during booting of the data processing system: the first platform retrieving from the hardware management console the first digital signature; the first trusted platform module hashing the first digital signature to generate a second hashed signature value; and the first trusted platform module storing the second hashed signature value;

the first trusted platform module receiving a request from the hardware management console for the first trusted platform module to execute a command;

the first trusted platform module determining whether the command requires that physical presence be verified by the first trusted platform module prior to the first trusted platform module executing the command;

responsive to determining during runtime of the system that the command does require that physical presence be verified:

the first platform retrieving from the hardware management console the first digital signature;

the first trusted platform module hashing the first digital signature to produce a second hashed signature value;

the first platform comparing the second hashed signature value to the first hashed signature value;

responsive to determining that the second hashed signature value is the same as the first hashed signature value, the first platform determining that the hardware management console is a trusted entity; and responsive to determining that the second hashed signature value is different from the first hashed signature value, the first platform determining that the hardware management console is not a trusted entity;

the first platform using the first trusted platform module for determining whether the hardware management console has knowledge of a first secret key possessed by the first trusted platform module, wherein determining whether the hardware management console has knowledge of the first secret key further comprises:

the hardware management console requesting, during booting of the data processing system, a key from the first trusted platform module;

the hardware management console receiving the key from the first trusted platform module during booting of the data processing system;

the hardware management console associating the key, within the hardware management console during booting of the data processing system, with the first trusted platform module;

the hardware management console storing the key during booting of the data processing system;

the first trusted platform module receiving a request from the hardware management console for the first trusted platform module to execute a command;

the first trusted platform module determining whether the command requires that physical presence be verified by the first trusted platform module prior to the first trusted platform module executing the command;

responsive to the first trusted platform module determining that the command does require that physical presence be verified:

the first trusted platform module receiving from the hardware management console the key that the hardware management console has associated with the first trusted platform module;

the first platform using the first trusted platform module comparing the key received from the hardware management console with a key stored in the first trusted platform module;

responsive to the first platform using the first trusted platform module determining that the key received from the hardware management console is the same as the key stored in the first trusted platform module, the first platform determining that the hardware management console has knowledge of the first secret key; and responsive to the first platform using the first trusted platform module determining that the key received from the hardware management console is different from the key stored in the first trusted platform module, the first platform determining that the hardware management console does not have knowledge of the first secret key;

responsive to determining that the hardware management console is a trusted entity and has knowledge of the first secret key, the first trusted platform module determining that physical presence has been successfully asserted to the first trusted platform module, wherein physical presence has been proven to the first trusted platform module;

the hardware management console storing, during a manufacturing of the hardware management console, a first digital signature in the hardware management console that identifies the hardware management console;

the first trusted platform module hashing the first digital signature during booting of the hardware management console, to generate a first hashed signature value; and the first trusted platform module storing, during the booting, the first hashed signature value in the first trusted platform module.

6. The apparatus according to claim 5, further comprising:

the first trusted platform module receiving a request from the hardware management console for the first trusted platform module to execute a command;

the first trusted platform module determining whether the command requires that physical presence be verified by the first platform using the first trusted platform module prior to the first trusted platform module executing the command;

responsive to determining that the command does not require that physical presence be verified, the first trusted platform module executing the command without verifying physical presence; and responsive to determining that the command does require that physical presence be verified, the first platform using the first trusted platform module for determining whether the hardware management console is a trusted entity and determining whether the hardware management console has knowledge of the secret key, and responsive to determining that the hardware management console is a trusted entity and has knowledge of the secret key, the first trusted platform module executing the command.

7. The apparatus according to claim 5, further comprising:

the data processing system including a second platform, that is separate from the first platform, that includes a second trusted platform module.

8. The apparatus according to claim 7, further comprising:

a second secret key included in the second trusted platform module;

during booting of the data processing system: the hardware management console requesting the first secret key from the first trusted platform module; the hardware management console receiving, from the first trusted platform module, the first secret key; the hardware management console associating the first secret key, within the hardware management console, with the first trusted platform module; the hardware management console requesting the second secret key from the second trusted platform module; the hardware management console receiving, from the second trusted platform module, the second secret key; the hardware management console associating the second secret key, within the hardware management console, with the second trusted platform module; and the hardware management console storing, in the hardware management console, the first and second secret keys;

the second trusted platform module receiving a request from the hardware management console for the second trusted platform module to execute a command;

the second trusted platform module determining whether the command requires that physical presence be verified by the second trusted platform module prior to the second trusted platform module executing the command;

responsive to determining that the command does require that physical presence be verified:

the second trusted platform module receiving from the hardware management console the second secret key that the hardware management console has associated with the second trusted platform module;

the second platform comparing, using the second trusted platform module, the second secret key received from the hardware management console with the second secret key stored in the second trusted platform module;

responsive to determining that the second secret key received from the hardware management console is the same as the second secret key stored in the second trusted platform module, the second platform determining that the hardware management console has knowledge of the second secret key; and responsive to determining that the second secret key received from the hardware management console is different from the second secret key stored in the second trusted platform module, the second platform determining that the hardware management console does not have knowledge of the second secret key.

9. A computer program product in a computer readable storage medium for asserting physical presence in a trusted computing environment included within a data processing system, the data processing system coupled to a hardware management console, the computer program product comprising:

instructions for providing a first trusted platform module in a first platform in said system;

instructions for determining, by the first platform using the first trusted platform module, whether the hardware management console is a trusted entity, wherein the instructions for determining whether the hardware management console is a trusted entity further comprises:

during booting of the data processing system: instructions for retrieving from the hardware management console, by the first platform that includes the first trusted platform module, the first digital signature; instructions for hashing, by the first trusted platform module, the first digital signature to generate a second hashed signature value; and instructions for storing, in the first trusted platform module, the second hashed signature value;

instructions for receiving, within the first trusted platform module, a request from the hardware management console for the first trusted platform module to execute a command;

instructions for determining whether the command requires that physical presence be verified by the first trusted platform module prior to the first trusted platform module executing the command;

responsive to determining during runtime of the data processing system that the command does require that physical presence be verified:

instructions for retrieving from the hardware management console, by the first platform, the first digital signature;

instructions for hashing, by the first trusted platform module, the first digital signature to produce a second hashed signature value;

instructions for comparing, by the first platform, the second hashed signature value to the first hashed signature value;

responsive to determining that the second hashed signature value is the same as the first hashed signature value, instructions for determining, by the first platform, that the hardware management console is a trusted entity; and responsive to determining that the second hashed signature value is different from the first hashed signature value, instructions for determining, by the first platform, that the hardware management console is not a trusted entity;

instructions for determining, by the first platform using the first trusted platform module, whether the hardware management console has knowledge of a first secret key possessed by the first trusted platform module, wherein determining whether the hardware management console has knowledge of the first secret key further comprises:

instructions for requesting, by the hardware management console during booting of the data processing system, a key from the first trusted platform module;

instructions for receiving, by the hardware management console from the first trusted platform module during booting of the data processing system, the key;

instructions for associating the key, within the hardware management console during booting of the data processing system, with the first trusted platform module;

instructions for storing, in the hardware management console during booting of the data processing system, the key;

instructions for receiving, within the first trusted platform module, a request from the hardware management console for the first trusted platform module to execute a command;

instructions for determining whether the command requires that physical presence be verified by the first trusted platform module prior to the first trusted platform module executing the command;

responsive to determining that the command does require that physical presence be verified;

instructions for receiving from the hardware management console, by the first trusted platform module, the key that the hardware management console has associated with the first trusted platform module;

instructions for comparing, by the first platform using the first trusted platform module, the key received from the hardware management console with a key stored in the first trusted platform module;

responsive to determining, by the first platform using the first trusted platform module, that the key received from the hardware management console is the same as the key stored in the first trusted platform module, instructions for determining that the hardware management console has knowledge of the first secret key; and responsive to determining, by the first platform using the first trusted platform module, that the key received from the hardware management console is different from the key stored in the first trusted platform module, instructions for determining that the hardware management console does not have knowledge of the first secret key;

responsive to determining that the hardware management console is a trusted entity and has knowledge of the first secret key, instructions for determining that physical presence has been successfully asserted to the first trusted platform module, wherein physical presence has been proven to the first trusted platform module;

instructions for storing, during a manufacturing of the hardware management console, a first digital signature in the hardware management console that identifies the hardware management console;

instructions for hashing the first digital signature, by the first trusted platform module, during booting of the hardware management console, to generate a first hashed signature value; and instructions for storing, during said booting, the first hashed signature value in the first trusted platform module.

10. The computer program product according to claim 9, further comprising:

instructions for receiving, within the first trusted platform module, a request from the hardware management console for the first trusted platform module to execute a command;

instructions for determining whether the command requires that physical presence be verified by the first platform using the first trusted platform module prior to the first trusted platform module executing the command;

responsive to determining that the command does not require that physical presence be verified, instructions for executing, by the first trusted platform module, the command without verifying physical presence; and responsive to determining that the command does require that physical presence be verified, instructions for determining, by the first platform using the first trusted platform module, whether the hardware management console is a trusted entity and determining whether the hardware management console has knowledge of the secret key, and responsive to determining that the hardware management console is a trusted entity and has knowledge of the secret key, executing, by the first trusted platform module, the command.

11. The computer program product according to claim 9, further comprising:

instructions for including in the first trusted platform module the first secret key;

instructions for including in a second trusted platform module, that is located within a second platform to which the hardware management console is coupled, a second secret key;

during booting of the data processing system: instructions for requesting, by the hardware management console, the first secret key from the first trusted platform module; instructions for receiving, by the hardware management console from the first trusted platform module, the first secret key; instructions for associating the first secret key, within the hardware management console, with the first trusted platform module; instructions for requesting, by the hardware management console, the second secret key from the second trusted platform module; instructions for receiving, by the hardware management console from the second trusted platform module, the second secret key; instructions for associating the second secret key, within the hardware management console, with the second trusted platform module; and instructions for storing, in the hardware management console, the first and second secret keys;

instructions for receiving, within the second trusted platform module, a request from the hardware management console for the second trusted platform module to execute a command;

instructions for determining whether the command requires that physical presence be verified by the second trusted platform module prior to the second trusted platform module executing the command;

responsive to determining that the command does require that physical presence be verified:

instructions for receiving from the hardware management console, by the second trusted platform module, the second secret key that said HMC has associated with the second trusted platform module;

instructions for comparing, by the second platform that includes the second trusted platform module, the second secret key received from the hardware management console with the second secret key stored in the second trusted platform module;

responsive to determining, by the second platform that includes second trusted platform module, that the second secret key received from the hardware management console is the same as the second secret key stored in the second trusted platform module instructions for determining that the hardware management console has knowledge of the second secret key; and responsive to determining, by the second platform that includes the second trusted platform module, that the second secret key received from the hardware management console is different from the second secret key stored in the second trusted platform module, instructions for determining that the hardware management console does not have knowledge of the second secret key.

* * * * *